(12) United States Patent
Mishra et al.

(10) Patent No.: US 11,496,800 B2
(45) Date of Patent: Nov. 8, 2022

(54) SYSTEMS AND METHODS FOR OVERRIDING USER INPUT OF COMMANDS IN A MULTI-USER ENVIRONMENT

(71) Applicant: Rovi Guides, Inc., San Jose, CA (US)

(72) Inventors: Akanksha Mishra, Karnataka (IN); Manjappa Hullalad, Karnataka (IN); Susanto Sen, Karnataka (IN); Vikram Makam Gupta, Karnataka (IN)

(73) Assignee: ROVI GUIDES, INC., San Jose, CA (US)

( * ) Notice: Subject to any disclaimer, the term of this patent is extended or adjusted under 35 U.S.C. 154(b) by 0 days.

(21) Appl. No.: 17/204,389

(22) Filed: Mar. 17, 2021

(65) Prior Publication Data

US 2021/0258642 A1 Aug. 19, 2021

Related U.S. Application Data

(63) Continuation of application No. 16/169,691, filed on Oct. 24, 2018, now Pat. No. 10,986,404.

(51) Int. Cl.
*H04N 21/442* (2011.01)
*H04N 21/422* (2011.01)
*H04N 21/845* (2011.01)
*H04N 21/6587* (2011.01)

(52) U.S. Cl.
CPC . *H04N 21/44218* (2013.01); *H04N 21/42209* (2013.01); *H04N 21/44226* (2020.08); *H04N 21/6587* (2013.01); *H04N 21/8456* (2013.01)

(58) Field of Classification Search
CPC ....... H04N 21/44218; H04N 21/42209; H04N 21/44222; H04N 21/6587; H04N 21/8456
See application file for complete search history.

(56) References Cited

U.S. PATENT DOCUMENTS

| | | | |
|---|---|---|---|
| 5,663,756 A | 9/1997 | Blahut et al. | |
| 6,239,794 B1 | 5/2001 | Yuen et al. | |
| 6,564,378 B1 | 5/2003 | Satterfield et al. | |
| 6,732,367 B1 | 5/2004 | Ellis et al. | |
| 7,165,098 B1 | 1/2007 | Boyer et al. | |
| 7,761,892 B2 | 7/2010 | Ellis et al. | |
| 8,079,044 B1 | 12/2011 | Craner | |

(Continued)

*Primary Examiner* — Alazar Tilahun
*Assistant Examiner* — Alexander Boyd
(74) *Attorney, Agent, or Firm* — Haley Guiliano LLP

(57) ABSTRACT

The system and methods described herein determine whether to override commands to modify content presentation in a multi-user content consumption environment. A media guidance application detects a first and second user consuming content. Upon receiving a command from the first user to modify the presentation of the content, the media guidance application retrieves a user profile of the second user and compares attributes in the user profile to metadata for the segment of the content. Based on the comparison, the media guidance application determines whether to override the command, for example based on a predicted interest level or importance level determined by the comparison. In response to determining to override the command, the media guidance application refrains from executing the command by canceling or delaying the command and generates a notification message to the user with a reason why the command was overridden.

20 Claims, 8 Drawing Sheets

(56) References Cited

U.S. PATENT DOCUMENTS

| | | |
|---|---|---|
| 9,100,694 B1 | 8/2015 | Chandel et al. |
| 9,961,410 B1 | 5/2018 | Wang |
| 2002/0174430 A1 | 11/2002 | Ellis et al. |
| 2003/0237093 A1 | 12/2003 | Marsh |
| 2005/0251827 A1 | 11/2005 | Ellis et al. |
| 2010/0031286 A1 | 2/2010 | Gupta et al. |
| 2011/0072452 A1 | 3/2011 | Kim et al. |
| 2014/0078039 A1 | 3/2014 | Woods et al. |
| 2014/0082670 A1 | 3/2014 | Papish |
| 2014/0282693 A1* | 9/2014 | Soundararajan ............................ H04N 21/42204 725/32 |
| 2015/0185840 A1 | 7/2015 | Golyshko et al. |
| 2015/0319400 A1 | 11/2015 | Golyshko |
| 2017/0272818 A1* | 9/2017 | Gattis .............. H04N 21/44218 |
| 2017/0332139 A1 | 11/2017 | Blake et al. |
| 2017/0332140 A1 | 11/2017 | Blake et al. |
| 2017/0366859 A1 | 12/2017 | Chimayan et al. |
| 2018/0160195 A1 | 6/2018 | Redmond et al. |
| 2018/0181566 A1* | 6/2018 | Lee ................... H04N 21/4334 |
| 2018/0336275 A1 | 11/2018 | Graham et al. |

\* cited by examiner

SYSTEMS AND METHODS FOR OVERRIDING USER INPUT OF COMMANDS IN A MULTI-USER ENVIRONMENT

CROSS-REFERENCE TO RELATED APPLICATION

This application is a continuation of U.S. patent application Ser. No. 16/169,691, filed Oct. 24, 2018, the disclosure of which are hereby incorporated by reference herein in their entireties.

BACKGROUND

The present disclosure is directed to overriding commands received from a user to control content display and, more particularly, to systems and methods that override commands that change content display based on whether a second user is engaged in the content.

SUMMARY

Consuming content in a multi-user environment can enhance a user's experience with the content by providing a more social, engaging experience. However, multi-user content consumption presents challenges when users disagree on whether to continue to watch certain content or switch to different content. An individual user may provide a command (e.g., by using a remote control or interacting with a program guide) to change content at an inopportune moment (e.g., during an important scene not previously viewed by other users). Other users who are consuming the content, especially those not in control of the content presentation, may experience frustration when another user interrupts the presentation of that content. In another scenario, the other users may not be aware that the part of the content they will be missing is important, but their overall content consumption experience may nonetheless be diminished by missing that part of the content (e.g., because the missed part involves a crucial plot point).

Solutions over conventional systems for controlling content presentation (e.g., displaying movies or television shows) are described herein. The systems and methods described herein achieve benefits over conventional systems by overriding commands that control content presentation, particularly commands received in multi-user environments. A content presentation system detects that a first user and a second user are consuming content together and receives a command from the first user to change the content (e.g., fast-forward through the content or display a different show). The content presentation system determines whether the received command should be executed as-is or whether the command should be modified (e.g., delayed) or cancelled based on the profile of another user who did not send the command. For example, the content presentation system may retrieve a profile for the second user, determine that the second user has not watched the current content being presented, and, based on that determination, override the first user's command. The content presentation system may delay the command or cancel the command entirely. Thus, the content presentation system takes into account not only the commands received from a first user in a multi-user presentation environment but also the profile of a second user before executing commands that change the content presentation.

Several techniques are described herein for determining whether to override a command based on a user's profile. As discussed above, the content presentation system may track whether a user has watched the current segment being displayed. For example, the content presentation system may access the viewing history to determine whether the user has previously consumed a show in its entirety or in part. The content presentation system may access granular viewing data (e.g., through content consumption logs) to determine whether a current point in time has been logged as consumed by the second user or index information that tracks whether specific scenes have been consumed. In some embodiments, the content presentation system may access information that indicates the user's interests in particular scenes (e.g., action scenes or comedy scenes) and compare the user's interests to metadata about the segment of content being presented. The content presentation system may factor these preferences into the determination of whether to override a command that changes presentation of the content. For example, if the user's content preferences indicate a strong affinity for action, and the current segment is an action scene, the system may determine the user has a high level of interest in the current content. Further, the content recommendation system may employ a set of weights corresponding to different preferences and the strength of the match with each preference to determine interest levels. Additionally or alternatively, the content presentation system may access information about the content that is untethered to the user to generate the predicted interest level. For example, the score of a live game may be used to predict a user's interest in the segment or the number of users on social media watching the same segment at the same time may indicate the segment is interesting. The content presentation system may weigh such factors into the calculation of a predicted interest level.

In some embodiments, an importance level is used when determining whether to override commands. For example, metadata may indicate whether a scene is central to a plotline or is otherwise of importance to the content. When a user issues a command, such as a skip command, the content presentation system may determine that the segment being skipped has a high level of importance and override the command to prevent the user from missing an important segment. In some embodiments, the importance level may be determined relative to a user profile that, for example, indicates the user has a strong affinity to a plotline being shown in the current segment.

Thus, the systems and methods described herein solve the problem of balancing the need to provide users with control of content presentations with the need to prevent users from missing content they care about. The techniques described herein override commands that would result in users missing content at times when the users would be particularly affected by missing the content.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Figure 1A:
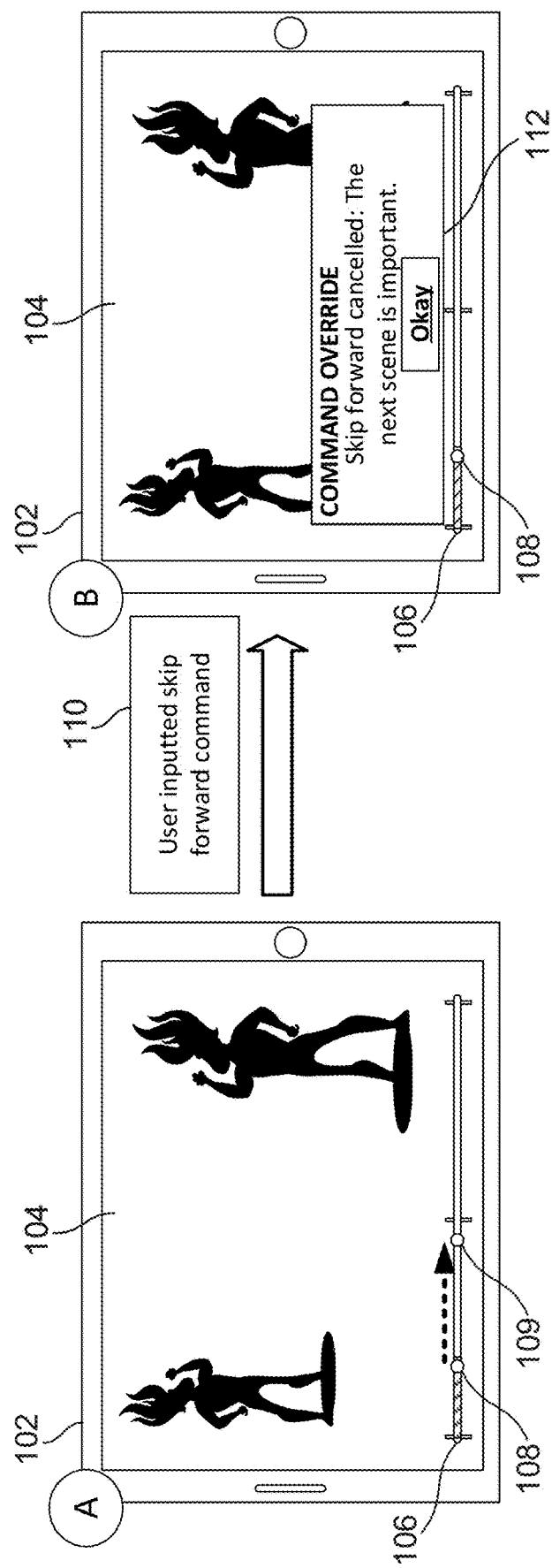
FIG. 1A shows an illustrative series of user interface screens on a content consumption device in a system that overrides commands that change content presentation, in accordance with some embodiments of the disclosure.

FIG. 1A shows an illustrative series of user interface screens on a content consumption device in a system that overrides commands that change content presentation. Specifically, FIG. 1A depicts user equipment device 102 at two time points: A and B. User equipment device is depicted as a tablet device in FIG. 1A. In some embodiments, user equipment device 102 may be a smartphone, set-top box, personal computer, or other device suitable for rendering content (e.g., movies, television shows, linear programming, and over-the-top (OTT) content). At time point A, user equipment 102 is displaying a scene 104 (illustrated as featuring an animated superhero). At time point A, the user equipment 102 is also displaying a time bar 106 that includes a current position indicator 108 that is approximately 20 percent down the time bar for the content item that scene 104 belongs to.

At time point A, and before time point B, user equipment device 102 receives a user-inputted skip forward command 110 (e.g., through a remote control device, via an interactive program guide, through a voice command, through a touchscreen input, etc.) to switch from current position indicator 108 to desired position indicator 109, which would skip at least a portion of scene 104. As described in further detail below, in relation to FIG. 6, the system may determine whether to execute or override the skip forward command based on determining whether scene 104 would be of interest to a user viewing the scene (i.e., the user who input the command or another user present). In another embodiment, and as described in further detail below in relation to FIG. 7, the system may determine whether to execute or override the skip forward command based on determining whether scene 104 is important to the overall content item (for example, based on metadata of the scene indicating whether it is central to the plotline of the content item). In another embodiment, and as described in further detail below in relation to FIG. 8, the system may determine whether to execute or override the skip forward command based on determining whether scene 104 has been previously viewed by a user viewing the scene (for example, based on a user's viewing history).

At time point B, the system has determined to override the user-inputted skip forward command, and user equipment device 102 continues to display scene 104 at current position indicator 108. At time point B, a notification 112 is displayed to the user informing the user of the command being overridden and providing a reason for why the command was overridden. In some embodiments, alternative to or in addition to displaying a notification, the system may notify the user of a command override via other means, such as through an audio output or through a notification displayed on a different user device than user equipment device 102. In some embodiments, the command override may be temporary and the command may be delayed for execution at later time. For example, the system may override a command to fast-forward a movie for the duration of an important scene but may execute the command once the scene has ended. The system may, for example, display a notification (or alert the user through other means) indicating that the command has been delayed and will be executed after a given period of time.

Figure 1B:
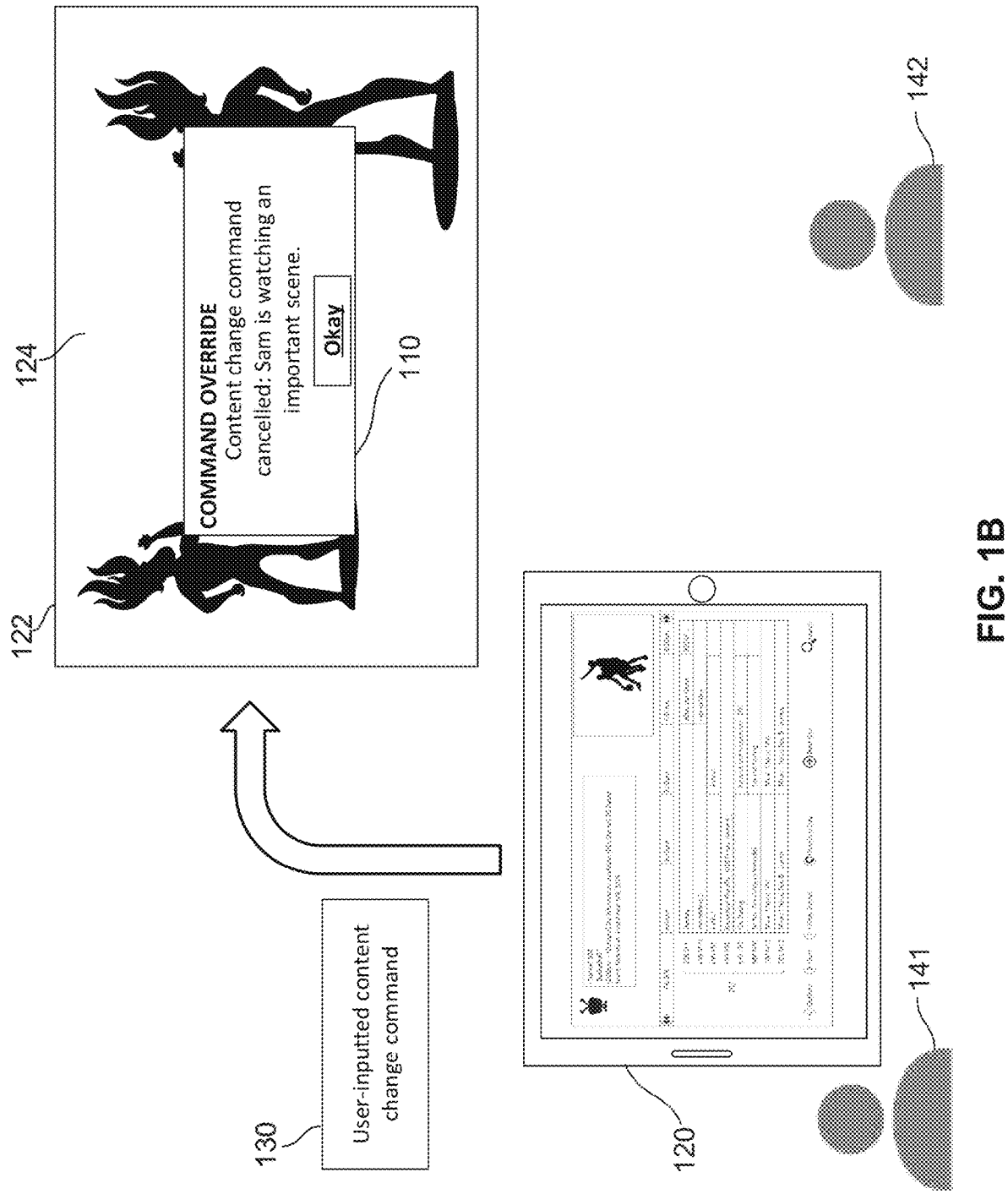
FIG. 1B shows illustrative user interface screens in a multi-user system that overrides commands that change content presentation, in accordance with some embodiments of the disclosure.

FIG. 1B shows illustrative user interface screens in a multi-user system that overrides commands that change content presentation. Specifically, FIG. 1B depicts a user input device 120 that controls content presentation on a user equipment device 122. User input device 120 is depicted as a tablet device in FIG. 1B. In some embodiments, user input device 120 may be a smartphone, set-top box, personal computer, or other device suitable for providing a user interface for user input (e.g., a voice assistant device). User equipment device 122 may be a tablet, smartphone, set-top box, personal computer, or other device suitable for rendering content (e.g., movies, television shows, linear programming, and over-the-top (OTT) content).

In FIG. 1B, a first user 141 and a second user 142 are viewing a scene 124 on user equipment device 122. First user 141 inputs a content change command 130 (e.g., a fast-forward command or a change channel command) via user input device 120 (e.g., through a touchscreen input, by pressing a button or series of buttons on a remote control device, through a voice command, etc.). The system determines whether to override the command, for example by retrieving a user profile of second user 142 and determining whether the second user's content preferences align with scene 124. Further embodiments on determining whether to override the command are described below in relation to FIGS. 6-8.

In FIG. 1B, the system determines to override the content change command by first user 141 and displays a notification 110, overlaid on scene 124, that notifies users 141 and 142 of the command override. As discussed above in relation to FIG. 1A, in some embodiments, alternative to or in addition to displaying a notification, the system may notify the users of a command override via other means, such as through an audio output or through a notification displayed on a different user device than user equipment device 122.

Figure 2:
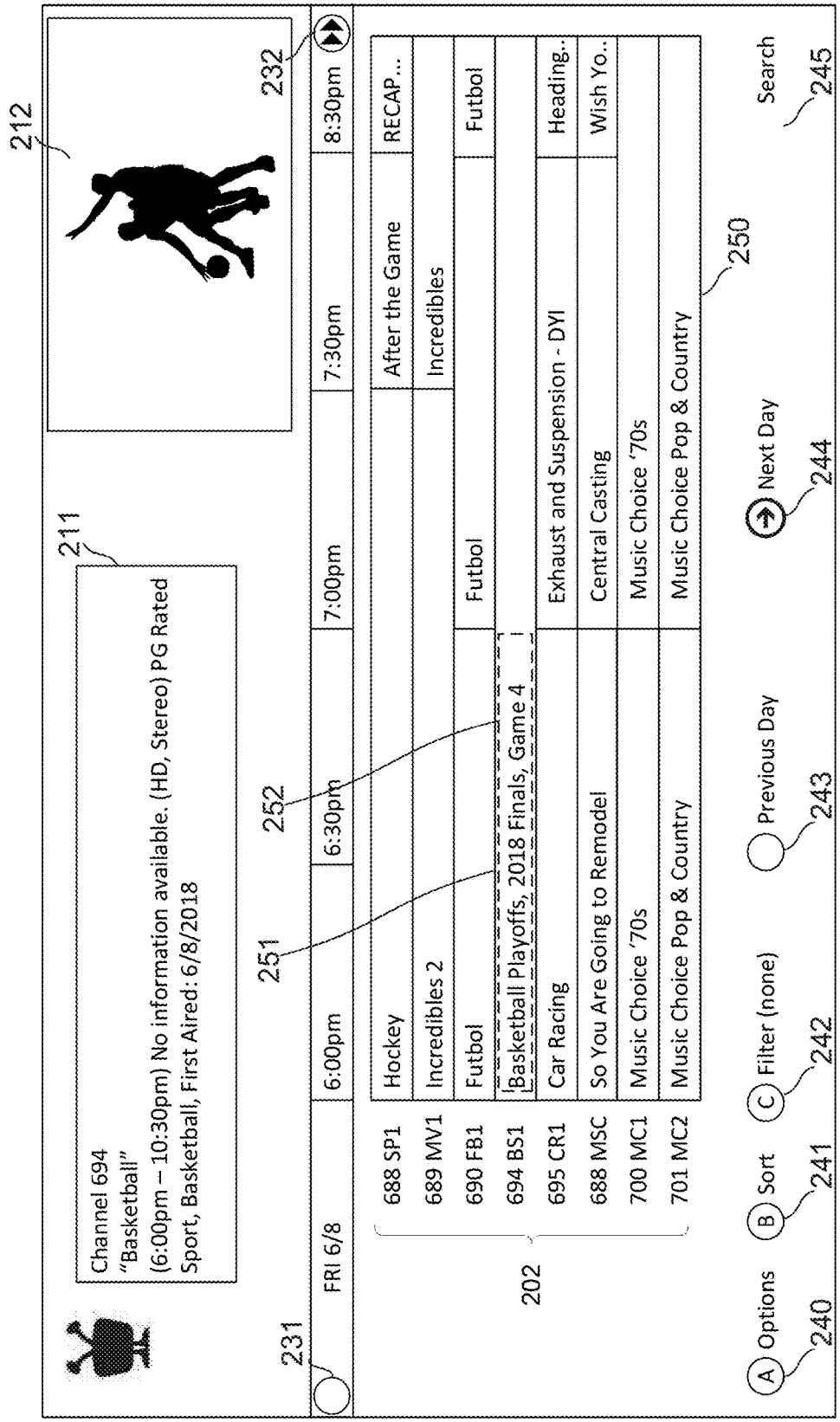
FIG. 2 shows an illustrative embodiment of a display screen that may be used to provide media listings and other media information, in accordance with some embodiments of the disclosure.

FIG. 2 is an illustrative embodiment of a display screen that may be used to provide media listings and other media information, in accordance with some embodiments of the disclosure. Program listings display 200 includes a grid 250 arranged by time and channel that also enables access to different types of content in a single display. Grid 250 may include (1) a column of channel/content type identifiers 202 where each channel/content type identifier (which is a cell in the column) identifies a different channel or content type available; and (2) a row of time identifiers (displayed above program listings), where each time identifier (which is a cell in the row) identifies a time block of programming. Grid 250 also includes cells of program listings, such as program listing 251 (highlighted to indicate the user equipment is currently receiving the content selected at 251), where each listing provides the title of the program provided on the listing's associated channel and time. With a user input device, a user can select program listings by moving highlight region 252. Information relating to the program listing selected by highlight region 252 may be provided in program information region 211. Region 211 may include, for example, the program title, the program description, the time the program is provided (if applicable), the channel the program is on (if applicable), the program's rating, and other desired information. With a user input device, a user can also select grid forward option 232 or grid back option 231, which shift the displayed program times for content selection. The display 200 may also provide several elements such as options element 240, which raises a submenu to customize display 200 options; sort element 241, which allows a user to customize the sorting of channels (e.g., sort by channel number or genre type); filter option 242 (e.g., allowing a user to filter listing by genre); previous-day element 243 (e.g., shifting the grid 250 by 24 hours into the past); next-day element 244 (e.g., shifting the grid by 24 hours into the future); and search element 245 (e.g., raising a search interface).

In addition to providing access to linear programming (e.g., content that is scheduled to be delivered by multicast delivery to user equipment devices at a predetermined time and provided according to a schedule), the media guidance application also provides access to non-linear programming (e.g., content accessible to a user equipment device at any time and not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on demand as streaming content or downloadable content through an Internet website or other Internet access (e.g., FTP).

Display 200 may also include video region 212. Video region 212 may allow the user to view and/or preview programs that are currently available, will be available, or were available to the user. The content of video region 212 may correspond to, or be independent from, one of the listings displayed in grid 250. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other content access application display screens of the embodiments described herein.

Upon receiving a selection to change to content selected by region 252, a user equipment device (such as user equipment device 102 and/or 122) may determine whether to override the selection such as described with reference to step 512 of FIG. 5 below.

The instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

Applications may be, for example, stand-alone applications implemented on user equipment devices, media content sources, or servers. For example, the media guidance application may be implemented as software or a set of executable instructions, which may be stored in storage (e.g., storage 308 or storage 414) and executed by control circuitry (e.g., control circuitry 304 or control circuitry 410). In some embodiments, applications may be client-server applications where only a client application resides on the user equipment device (e.g., user equipment 102) and a server application resides on a remote server (e.g., server 404). For example, applications may be implemented partially as a client application on control circuitry 304 of each one of user equipment devices 300 and user equipment system 301 and partially on a remote server such as a server application (e.g., server 404) running on control circuitry (e.g., 410) of the remote server. When executed by control circuitry of the remote server (such as server 404), the media guidance application may instruct the control circuitry to generate the content delivery application displays and transmit the generated displays to the user equipment devices. The media guidance application may instruct the control circuitry of the content source to transmit data for storage on the user equipment. The client application may instruct control circuitry of the receiving user equipment to generate the content delivery application displays.

Figure 3:
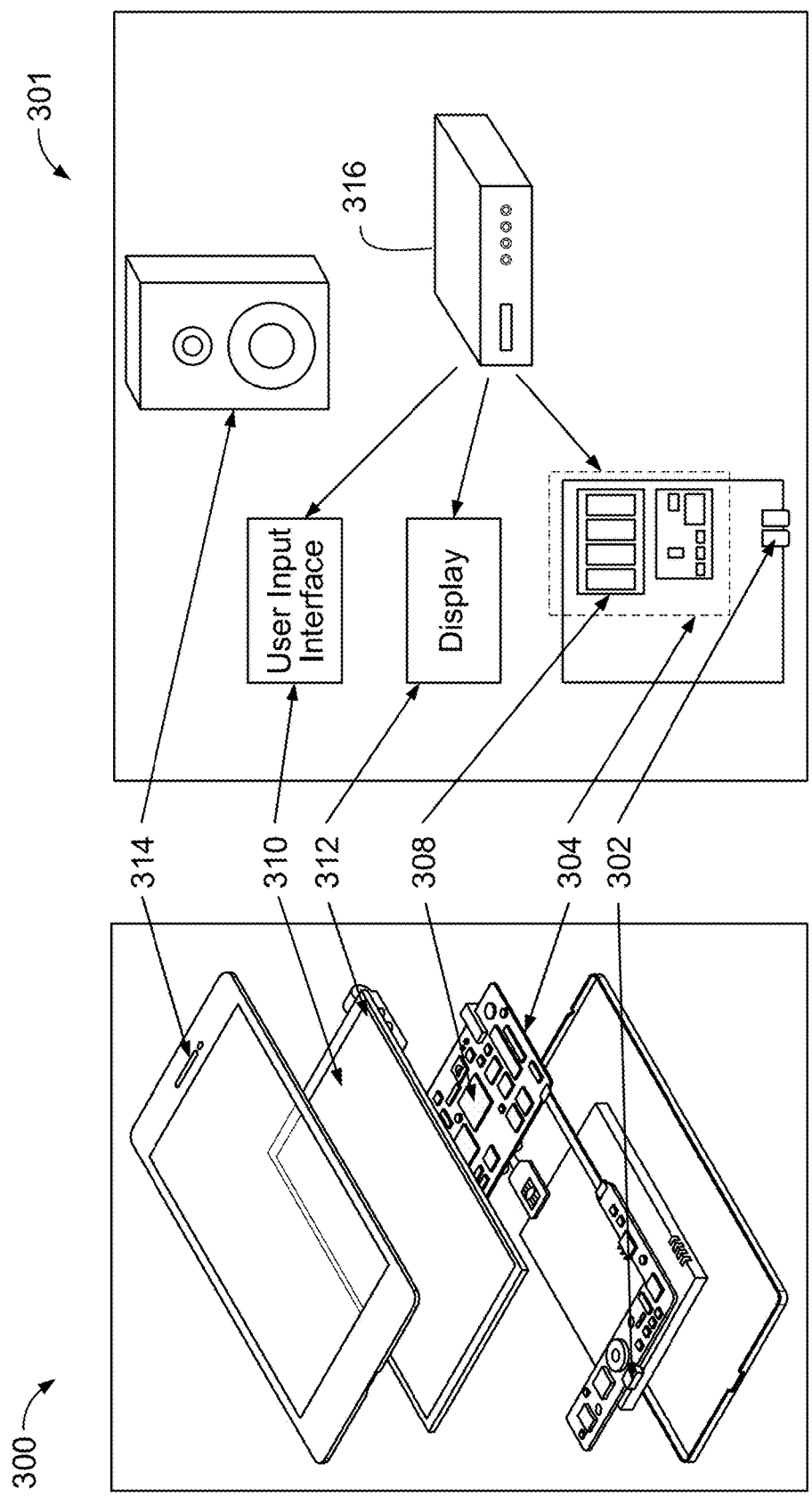
FIG. 3 is a diagram of illustrative user equipment, in accordance with some embodiments of the disclosure.

Users may access content and the applications from one or more of their media devices, i.e., user equipment. FIG. 3 shows generalized embodiments of an illustrative device, i.e., user equipment 102. For example, user equipment 102 may be a smartphone device, a tablet, or a remote control, such as illustrative user equipment 300. In another example, user equipment 102 may be part of a user equipment system 301. User equipment system 301 may include a set-top box 316. Set-top box 316 may be communicatively connected to speaker 314 and display 312. In some embodiments, display 312 may be a television display or a computer display. In some embodiments, set-top box 316 may be communicatively connected to user interface input 310. In some embodiments, user interface input 310 may be a remote control device. Set-top box 316 may include one or more circuit boards. In some embodiments, the circuit boards may include control circuitry and storage (e.g., RAM, ROM, Hard Disk, Removable Disk, etc.). In some embodiments, circuit boards may include an input/output path. More specific implementations of user equipment devices are discussed below in connection with FIG. 4. Each one of user equipment devices 300 and user equipment system 301 may receive content and data via input/output (hereinafter "I/O")

path 302. I/O path 302 may provide content (e.g., broadcast programming, on-demand programming, Internet content, content available over a local area network (LAN) or wide area network (WAN), and/or other content) and data to control circuitry 304 and storage 308. Control circuitry 304 may be used to send and receive commands, requests, and other suitable data using I/O path 302. I/O path 302 may connect control circuitry 304 to one or more communications paths (described below). I/O functions may be provided by one or more of these communications paths but are shown as a single path in FIG. 3 to avoid overcomplicating the drawing.

Control circuitry 304 should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, control circuitry may be distributed across multiple separate units, for example, multiple of the same type of processing units (e.g., two Intel Core i7 processors) or multiple different processors (e.g., an Intel Core i5 processor and an Intel Core i7 processor). In some embodiments, control circuitry 304 executes instructions for an application stored in memory (e.g., storage 308). Specifically, control circuitry 304 may be instructed by the application to perform the functions discussed above and below. For example, the application may provide instructions to control circuitry 304 to generate the media guidance displays. In some implementations, any action performed by control circuitry 304 may be based on instructions received from the application.

In client server-based embodiments, control circuitry 304 may include communications circuitry suitable for communicating with a content recommendation application server (e.g., server 404) or other networks or servers. The instructions for carrying out the above-mentioned functionality may be stored on the content recommendation application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths. In addition, communications circuitry may include circuitry that enables peer-to-peer communication of user equipment devices, or communication of user equipment devices in locations remote from each other (described in more detail below).

Memory may be an electronic storage device provided as storage 308 that is part of control circuitry 304. As referred to herein, the phrase "electronic storage device" or "storage device" should be understood to mean any device for storing electronic data, computer software, or firmware, such as random-access memory, read-only memory, hard drives, non-transitory computer readable medium, or any other suitable fixed or removable storage devices, and/or any combination of the same. Storage 308 may be used to store various types of content, media guidance data, and instructions for executing content access applications. Nonvolatile memory may also be used (e.g., to launch a boot-up routine and other instructions).

Control circuitry 304 may include video-generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 304 may also include scaler circuitry for upconverting and downconverting content into the preferred output format of the user equipment 300. Circuitry 304 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video-generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch-and-record functions, picture-in-picture (PIP) functions, multiple-tuner recording, etc.). If storage 308 is provided as a separate device from user equipment 300, the tuning and encoding circuitry (including multiple tuners) may be associated with storage 308.

A user may send instructions to control circuitry 304 using user input interface 310. User input interface 310 may be any suitable user interface, such as a remote control, mouse, trackball, keypad, keyboard, touchscreen, touchpad, stylus input, joystick, voice recognition interface, or other user input interfaces. Display 312 may be provided as a stand-alone device or integrated with other elements of each one of user equipment device 300 and user equipment system 301. For example, display 312 may be a touchscreen or touch-sensitive display. In such circumstances, user input interface 310 may be integrated with or combined with display 312. A video card or graphics card may generate the output to the display 312. The video card may offer various functions such as accelerated rendering of 3D scenes and 2D graphics, MPEG-2/MPEG-4 decoding, TV output, or the ability to connect multiple monitors. The video card may be integrated with the control circuitry 304. Speakers 314 may be provided as integrated with other elements of each one of user equipment device 300 and user equipment system 301 or may be stand-alone units. The audio component of videos and other content displayed on display 312 may be played through speakers 314. In some embodiments, the audio may be distributed to a receiver (not shown), which processes and outputs the audio via speakers 314.

The media guidance application may be implemented using any suitable architecture. For example, the media guidance application may be a stand-alone application wholly implemented on each one of user equipment device 300 and user equipment system 301. In such an approach, instructions for the application are stored locally (e.g., in storage 308), and data for use by the application is downloaded on a periodic basis (e.g., from an out-of-band feed, from an Internet resource, or using another suitable approach). Control circuitry 304 may retrieve instructions of the application from storage 308 and process the instructions to generate any of the displays discussed herein. Based on the processed instructions, control circuitry 304 may determine what action to perform when input is received from input interface 310. For example, movement of a cursor on a display up/down may be indicated by the processed instructions when input interface 310 indicates that an up/down button was selected.

In some embodiments, the applications are client-server based applications. Data for use by a thick or thin client implemented on each one of user equipment device 300 and user equipment system 301 is retrieved on-demand by issuing requests to a server remote to each one of user equipment device 300 and user equipment system 301. In one example of a client-server based media guidance application, control circuitry 304 runs a web browser that interprets web pages provided by a remote server (e.g., server 404). For example, the remote server may store the instructions for the application in a storage device (e.g., 414). The remote server may process the stored instructions using circuitry (e.g., control circuitry 410) and generate the displays discussed above and below. The client device may receive the displays generated by the remote server and may display the content of the displays locally on equipment device 300. This way, the processing of the instructions is performed remotely by the server while the resulting displays are provided locally on equipment device 300. Equipment device 300 may receive inputs from the user via input interface 310 and transmit those inputs to the remote server for processing and generating the corresponding displays. For example, equipment device 300 may transmit a communication to the remote server indicating that an up/down button was selected via input interface 310. The remote server may process instructions in accordance with that input and generate a display of the application corresponding to the input (e.g., a display that moves a cursor up/down). The generated display is then transmitted to equipment device 300 for presentation to the user.

In some embodiments, the applications are downloaded and interpreted or otherwise run by an interpreter or virtual machine (run by control circuitry 304). In some embodiments, the applications may be encoded in the ETV Binary Interchange Format (EBIF), received by control circuitry 304 as part of a suitable feed, and interpreted by a user agent running on control circuitry 304. For example, the applications may be an EBIF application. In some embodiments, the content delivery application may be defined by a series of JAVA-based files that are received and run by a local virtual machine or other suitable middleware executed by control circuitry 304. In some of such embodiments (e.g., those employing MPEG-2 or other digital media encoding schemes), the applications may be, for example, encoded and transmitted in an MPEG-2 object carousel with the MPEG audio and video packets of a program.

Figure 4:
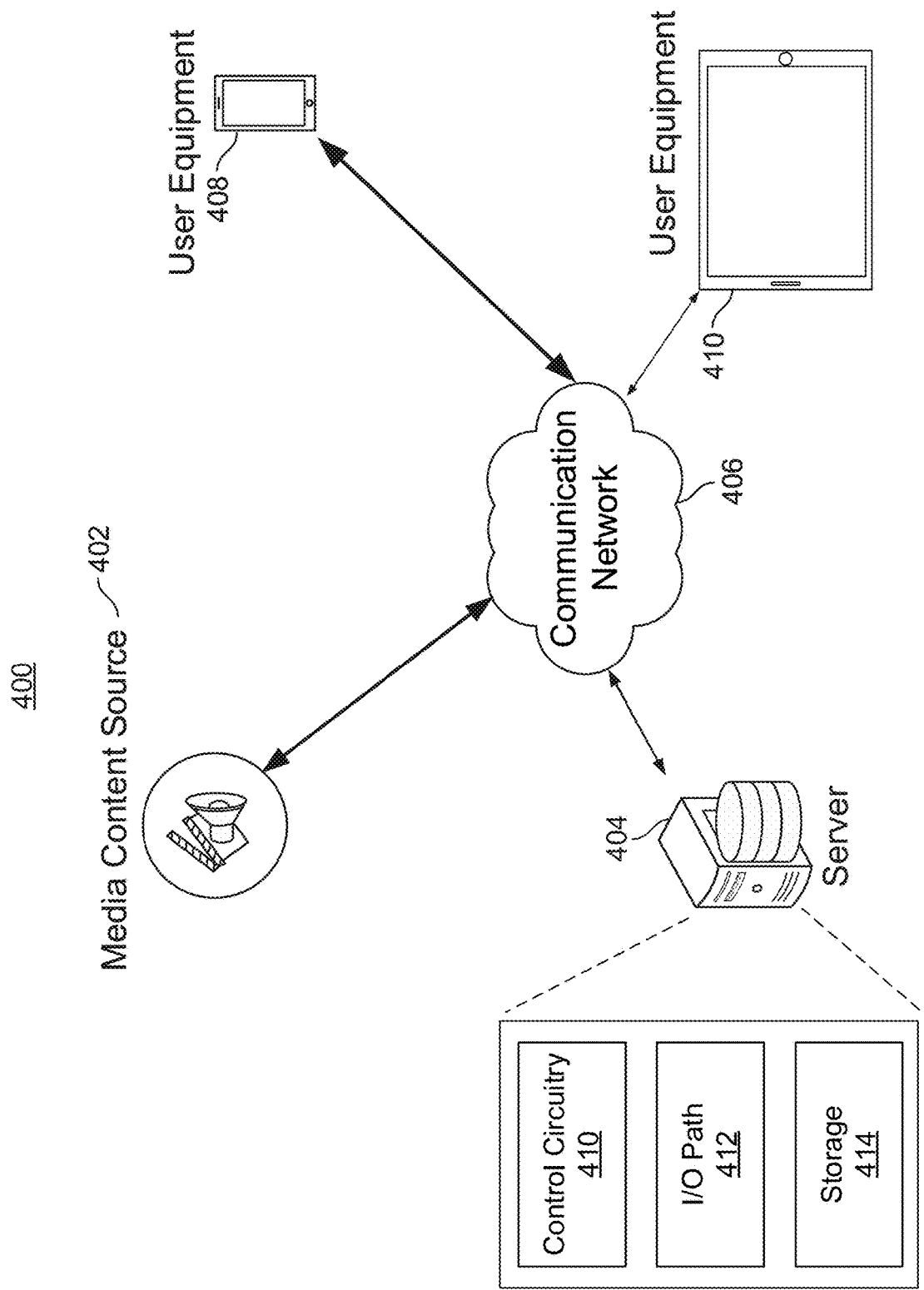
FIG. 4 is a diagram of an illustrative media system, in accordance with some embodiments of the disclosure.

FIG. 4 is a diagram of an illustrative media system, in accordance with some embodiments of the disclosure. User equipment devices 408 and 410 (such as user equipment device 102 and/or 122) may be coupled to communication network 406. Communication network 406 may be one or more networks including the Internet, a mobile phone network, mobile voice or data network (e.g., a 4G or LTE network), cable network, public switched telephone network, or other types of communications network or combinations of communications networks. Paths (e.g., depicted as arrows connecting the respective devices to communication network 406) may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. Communications with the client devices may be provided by one or more of these communications paths but are shown as a single path in FIG. 4 to avoid overcomplicating the drawing.

Although communications paths are not drawn between user equipment devices, these devices may communicate directly with each other via communication paths as well as other short-range, point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communication network 406.

System 400 includes media content source 402 and server 404. Communications with the media content source 402 and server 404 may be exchanged over one or more communications paths, but are shown as a single path in FIG. 4 to avoid overcomplicating the drawing. In addition, there may be more than one of each of media content source 402 and server 404, but only one of each is shown in FIG. 4 to avoid overcomplicating the drawing. If desired, media content source 402 and server 404 may be integrated as one source device.

In some embodiments, the server 404 may include control circuitry 410 and storage 414 (e.g., RAM, ROM, Hard Disk, Removable Disk, etc.). The server 404 may also include an input/output path 412. I/O path 412 may provide device information, or other data, over a local area network (LAN) or wide area network (WAN), and/or other content and data to control circuitry 410, which includes processing circuitry, and storage 414. Control circuitry 410 may be used to send and receive commands, requests, and other suitable data using I/O path 412. I/O path 412 may connect control circuitry 304 (and specifically processing circuitry) to one or more communications paths.

Control circuitry 410 may be based on any suitable processing circuitry such as one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, control circuitry 410 may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 410 executes instructions for an emulation system application stored in memory (e.g., storage 414).

Memory may be an electronic storage device provided as storage 414 that is part of Control circuitry 410. As referred to herein, the phrase "electronic storage device" or "storage device" should be understood to mean any device for storing electronic data, computer software, or firmware, such as random-access memory, read-only memory, hard drives, solid state devices, quantum storage devices, or any other suitable fixed or removable storage devices, and/or any combination of the same. Nonvolatile memory may also be used (e.g., to launch a boot-up routine and other instructions).

Server 404 may retrieve guidance data from media content source 402, process the data as will be described in detail below, and forward the data to the client devices 408 and 410. Media content source 402 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Media content source 402 may be the originator of content (e.g., a television broadcaster, a Webcast provider, etc.) or may not be the originator of content (e.g., an on-demand content provider, an Internet provider of content of broadcast programs for downloading, etc.). Media content source 402 may include cable sources, satellite providers, on-demand providers, Internet providers, over-the-top content providers, or other providers of content. Media content source 402 may also include a remote media server used to store different types of content (including video content selected by a user), in a location remote from any of the client devices. Systems and methods for remote storage of content and providing remotely stored content to user equipment are discussed in greater detail in connection with Ellis et al., U.S. Pat. No. 7,761,892, issued Jul. 20, 2010, which is hereby incorporated by reference herein in its entirety.

Media content source 402 may also provide media guidance data that can be used to create carousels and queries as described herein. Media guidance data may be provided to the client devices using any suitable approach. Program schedule data and other guidance data may be provided to the client devices on a television channel sideband, using an in-band digital signal, using an out-of-band digital signal, or by any other suitable data transmission technique.

Client devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices (such as, e.g., server 404), which may be located centrally or at distributed locations, that provide cloud-based services to various types of users and devices connected via a network such as the Internet via communication network 406. In such embodiments, user equipment devices may operate in a peer-to-peer manner without communicating with a central server.

The systems and devices described in FIGS. 3 and 4 enable not only display of the screens of FIGS. 1A, 1B, and 2, but also enable the execution of processes described in FIGS. 5-9. It should be noted that each step of processes described in FIGS. 5-9 is performed by the previously described control circuitry (e.g., in a manner instructed to control circuitry 304 or 410 by a media guidance application). It should be noted that the embodiments of FIGS. 5-9 can be combined with any other embodiment in this description and are not limited to the devices or control components used to illustrate the processes.

Figure 5:
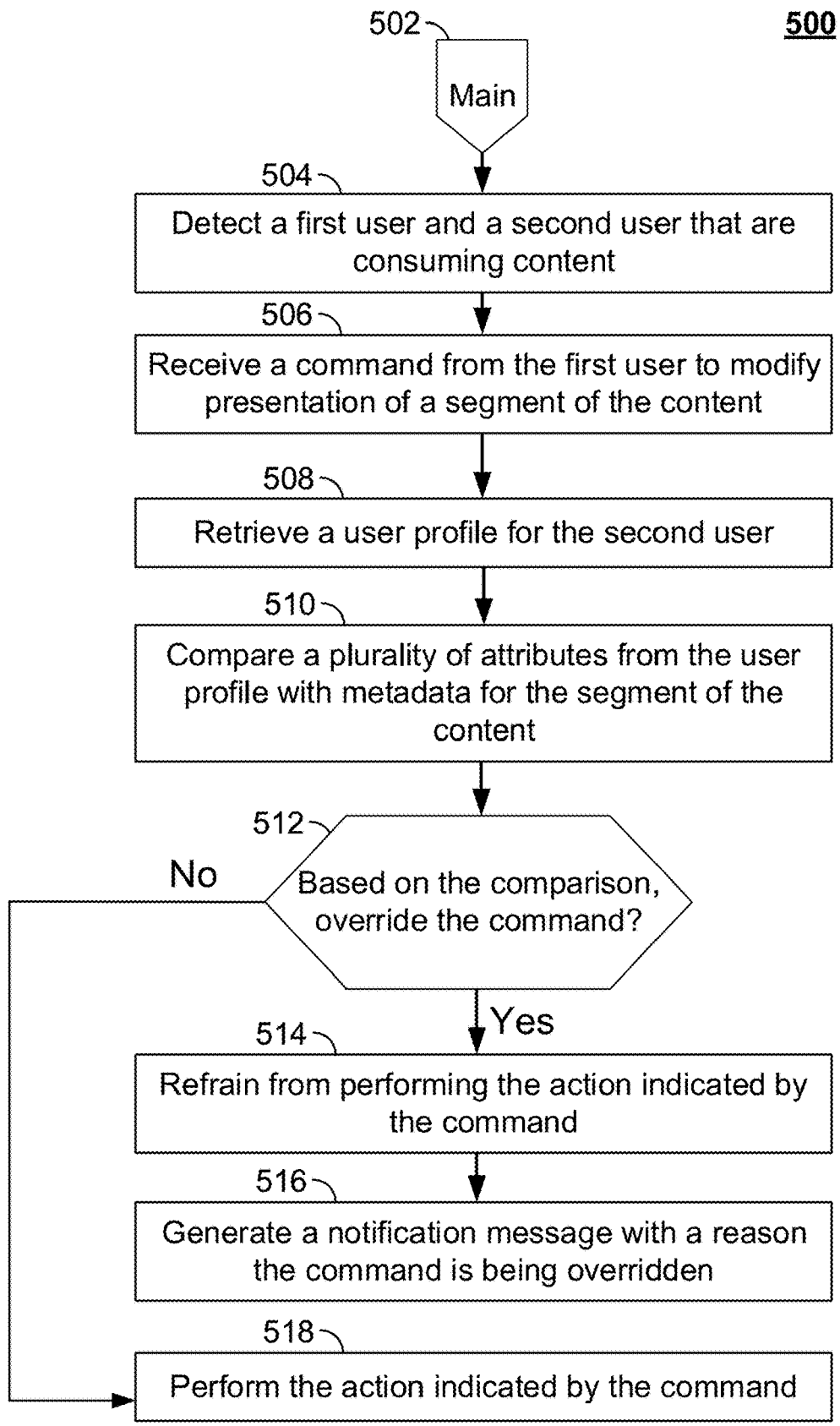
FIG. 5 is a flowchart of a detailed illustrative process for overriding commands that change content presentation, in accordance with some embodiments of the disclosure.

FIG. 5 is a flowchart of a detailed illustrative process for overriding commands that change content presentation, in accordance with some embodiments of the disclosure. A main loop of process 500 begins at step 502. At step 504, a media guidance application detects (e.g., using control circuitry 410) a first user and a second user (e.g., users 141 and 142 in FIG. 1B) who are consuming content (e.g., scene 124). For example, the media guidance application may use facial recognition (e.g., on the image or video feed of a camera (not shown) of user equipment device 408 and/or 410) or voice recognition (e.g., on audio input) to detect and identify users who are consuming content. In another example, the media guidance application may use users' location data (e.g., from a respective smartphone device for each user) to determine that the users are in the same location as a user equipment device that is outputting content (e.g., device 408 or 410). In another example, users may register or identify themselves with the media guidance application (e.g., through user input interface 310) before or during content consumption for the media guidance application to take their preferences into account during presentation of the content.

At step 506, the media guidance application receives (e.g., using control circuitry 410) a command from the first user (e.g., first user 141) to modify presentation of a segment of the content (e.g., scene 124). For example, the first user may select a playback option (e.g., fast-forward, rewind, pause, play at 1.5× speed) for the segment via user input interface 310 shown on display 312 of a user equipment device. In another example, the first user may press a button or series of buttons for a channel change via a remote control device that transmits the command over communication network 406 to control circuitry 410. In another example, the first user may issue a voice command to change the content segment.

At step 508, the media guidance application retrieves (e.g., using control circuitry 410) a user profile for the second user (e.g., second user 142). For example, the media guidance application may retrieve the user profile from storage 308 (at a user equipment device) or storage 414 (at a server). The user profile may include user preferences, viewing history and behavior, associated user equipment devices, etc. The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other websites on the Internet the user accesses, such as www.Tivo.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. Additional personalized media guidance application features are described in greater detail in Ellis et al., U.S. Patent Application Publication No. 2005/0251827, filed Jul. 11, 2005; Boyer et al., U.S. Pat. No. 7,165,098, issued Jan. 16, 2007; and Ellis et al., U.S. Patent Application Publication No. 2002/0174430, filed Feb. 21, 2002, which are hereby incorporated by reference herein in their entireties.

At step 510, the media guidance application compares (e.g., using control circuitry 410) a plurality of attributes from the user profile with metadata for the segment of the content. The plurality of attributes may be, for example, content preferences of the user. The metadata for the content segment may be retrieved from media content source 402 or storage 414 of server 404. For example, the metadata may identify a genre, producer, and actor in the current content segment, and the plurality of attributes may include affinity scores of the user for particular genres, producers, and actors. The media guidance application may compare the plurality of attributes from the user profile with metadata for the content segment by, for example, computing a weighted average of the affinity scores of the user for the genre, producer, actor, and/or other attribute of the current content segment, and comparing the weighted average with a threshold. In some embodiments, the media guidance application determines a weighted score for how well various metadata fields correspond to attributes in the user profile. For example, the weighted score may be aggregated from multiple correlation values, where each correlation value represents a similarity between a metadata field and a user profile attribute. The media guidance application may add the correlation values or average the correlation values to build a comparison score that is then compared to a threshold retrieved from storage.

At step 512, the media guidance application determines (e.g., using control circuitry 410), based on the comparison, whether to override the command to modify presentation of the content segment. For example, the media guidance application may retrieve a threshold value from memory (e.g., storage 414) and determine whether the weighted average of the affinity scores of the user for the attributes of the current content segment is above the threshold value. Some embodiments of the determination of whether to override the command are described in further detail below in relation to FIGS. 6-8. In some embodiments, results of multiple comparisons using different comparison criteria may be combined to determine whether to override the command (e.g., through a multi-conditional "if" statement evaluation). For example, the media guidance application may determine whether to override the command by first determining whether a user has not previously viewed the content segment and, if the user has not previously viewed the content segment, then determining whether a predicted interest level of the user satisfies an interest level criteria.

Process 500 continues to step 514 if the media guidance application determines to override the command. If the media guidance application does not determine to override the command, process 500 continues at step 518. At step 514, the media guidance application (e.g., using control circuitry 410) refrains from performing the action indicated by the command. For example, the media guidance application may remove the command from a command/action queue without performing the action indicated by the command. In another example, the media guidance application may delay the command so that the action indicated by the command is performed at a later time (e.g., after the current content segment has ended). An embodiment of refraining from performing the action indicated by the command is described in further detail below in relation to FIG. 9.

At step 516, the media guidance application generates (e.g., using control circuitry 410) a notification message with a reason the command is being overridden. In some embodiments, the media guidance application may keep track of the reason the command is being overridden as it determines whether to override the command at step 512. For example, at step 512, the media guidance application may determine whether to override the command with a sequential set of conditional statements. The media guidance application may determine whether a first conditional statement is true and, if so, determine to override the command and store (e.g., in storage 414) a reason identifier corresponding to the first conditional statement. If the first conditional statement is not found to be true, the media guidance application may determine whether a second conditional statement is true and, if so, determine to override the command and store a reason identifier corresponding to the second conditional statement. A reason identifier may be a hexadecimal value, an alphanumeric string, or other identifier. Each reason identifier may be mapped in a data structure to a natural language sentence that is provided to the user in the notification message. At step 516, the media guidance application may generate the notification message by retrieving (e.g., from storage 414) the reason identifier associated with the determination to override the command and the corresponding natural language sentence to be provided to the user in the notification message.

The notification message may be, for example, displayed on display 312 of the user equipment device that is displaying the content. Additionally or alternatively, the notification message may be displayed on the display of a device (e.g., a user input device) different from than that of the user equipment device that is displaying the content. Additionally or alternatively, the notification message may be an audio/verbal message output through speaker 314. In some embodiments, there may be multiple data structures mapping reason identifiers to natural language sentences, where each data structure corresponds to how the notification message will be provided to the user. For example, the natural language sentence of a given reason identifier corresponding to the notification message being displayed on a user equipment device may be different from the natural language sentence of a given reason identifier corresponding to the notification message being output verbally through a speaker. In some embodiments, the user may indicate to the system (e.g., in a user profile) preferences on how the notification message is provided to the user.

Figure 6:
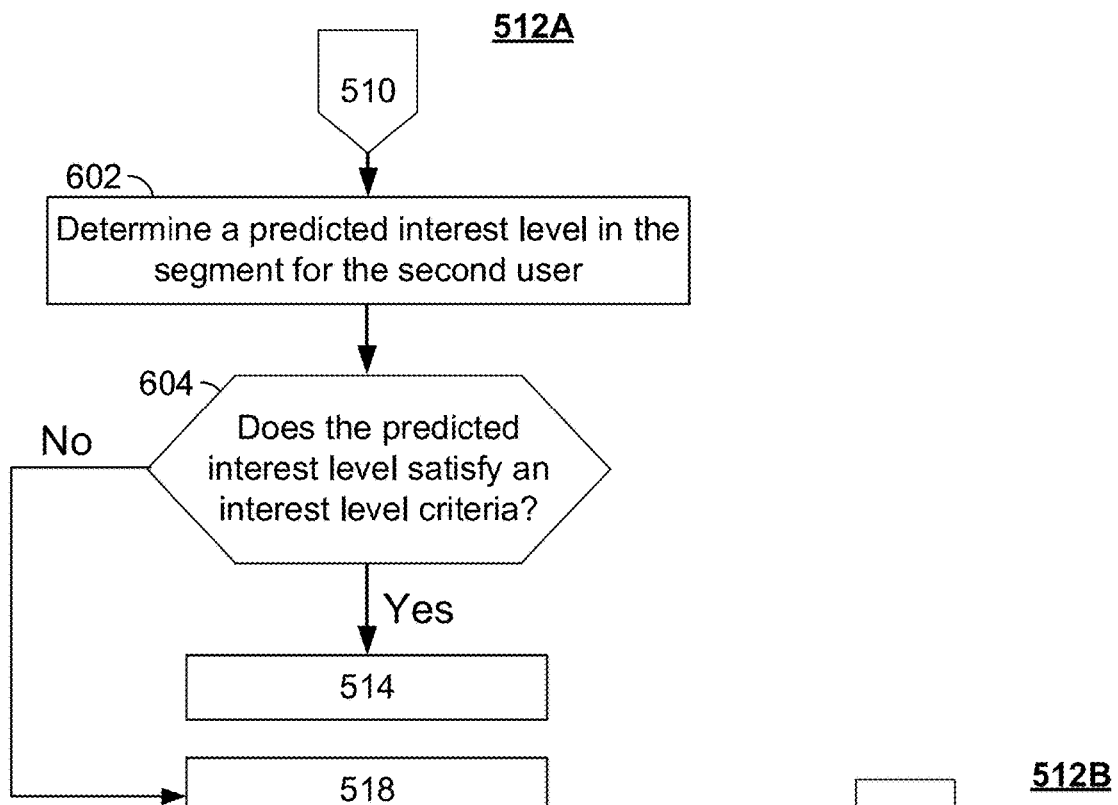
FIG. 6 is a flowchart of a detailed illustrative process for determining whether to override a command based on a predicted interest level of a user, in accordance with some embodiments of the disclosure.

FIG. 6 is a flowchart of a detailed illustrative process for determining whether to override a command based on a predicted interest level of a user, in accordance with some embodiments of the disclosure. Process 512A begins after step 510 of FIG. 5. At step 602, the media guidance application determines (e.g., using control circuitry 410) a predicted interest level in the segment (e.g., scene 124) for the second user (e.g., second user 142). For example, the media guidance application may determine, from metadata of the content segment, that the current content segment is comedic in genre. The media guidance application may then retrieve a ranking of genres for the user from the user profile and determine the interest level based on how highly comedy is ranked among other genres. In another example, the media guidance application may determine the predicted interest level by computing a weighted average of the user's affinity scores for attributes of the current content segment. The predicted interest level may be, for example, a numeric value (e.g., 4, in a range from 1 to 5), a percentage value (e.g., 90%), or an alphanumeric string (e.g., "High," "Medium," "Low").

At step 604, the media guidance application determines (e.g., using control circuitry 410) whether the predicted interest level satisfies an interest level criteria. For example, if the predicted interest level is based on a ranking of an attribute of the content segment, as described above, the interest level criteria may be whether the rank of the attribute is within a top percentage (e.g., the top 25%) of possible attributes. For example, if the current content segment is comedic in genre, and the user profile ranks comedy second among ten possible genres, the media guidance application may determine that the rank of comedic content falls within the top 25% of genres, and therefore that the interest level criteria has been satisfied. More broadly, the predicted interest level may be compared to an interest level threshold (e.g., retrieved from storage 414) to determine whether the interest level criteria has been satisfied. In some embodiments, the media guidance application may access the user's viewing history to build an interest model. The interest model may include content attributes and corresponding interest values that each indicate the user's affinity toward a particular content attribute based on viewing history. The media guidance application may use the interest model as the interest level criteria to determine whether the predicted interest level satisfies the interest level criteria. For example, the media guidance application may compare weighted components of the predicted interest level with weights for content attributes in the interest model.

Process 512A continues to step 514 if the media guidance application determines that the predicted interest level satisfies an interest level criteria. If the media guidance application does not determine that the predicted interest level satisfies an interest level criteria, process 512A continues at step 518.

Figure 7:
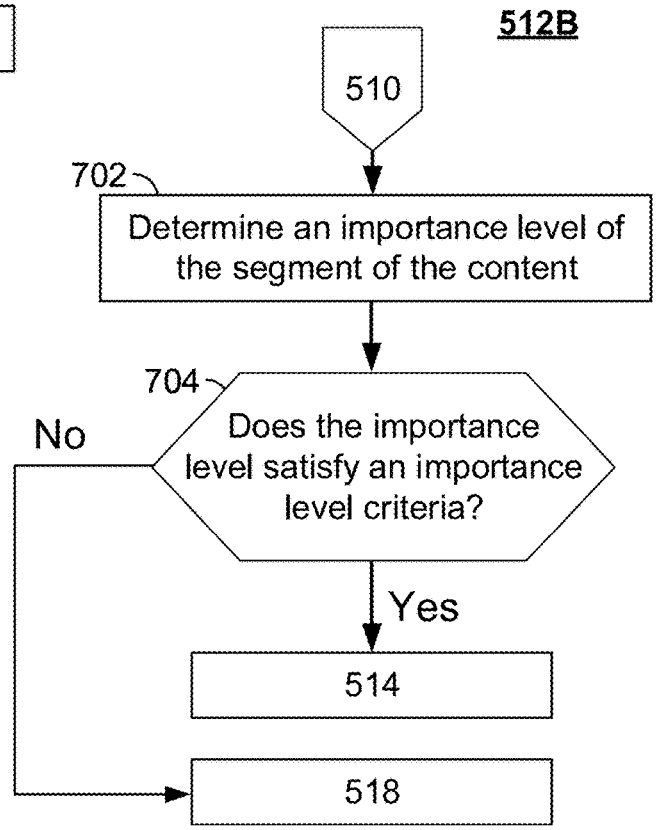
FIG. 7 is a flowchart of a detailed illustrative process for determining whether to override a command based on an importance level of a content segment, in accordance with some embodiments of the disclosure.

FIG. 7 is a flowchart of a detailed illustrative process for determining whether to override a command based on an importance level of a content segment, in accordance with some embodiments of the disclosure. Process 512B begins after step 510 of FIG. 5. At step 702, the media guidance application determines (e.g., using control circuitry 410) an importance level of the segment of the content (e.g., scene 124). For example, the media guidance application may retrieve the importance level from metadata of the content segment (e.g., from media content source 402 or storage 414 of server 404). The importance level may indicate how essential the content segment is to the overall plot of the content. In another example, the media guidance application may determine an importance level of the content segment via comparison of metadata of the content segment and attributes from the user profile, as described above in relation to FIG. 6. In some embodiments, the importance level may be based on popularity of the content segment, for example based on user ratings or number of views of the segment. In another example, a state of action in the segment, such as the score of a sporting event, may be used to determine an importance level of the segment (e.g., if the score is tied, the importance level may be determined to be higher than if the score is not tied). In some embodiments, the importance level may be determined by weighing and aggregating any of the factors listed above.

At step 704, the media guidance application determines (e.g., using control circuitry 410) whether the importance level satisfies an importance level criteria. For example, the importance level criteria may be whether the importance level matches or exceeds a threshold importance level (where the threshold importance level is retrieved from storage 414, for example). For example, if the importance level and threshold importance level are numeric values, control circuitry 410 may determine whether the importance level is greater than or equal to the threshold importance level. In another example, the importance level may be one of multiple ranked values—e.g., "High," "Medium," and "Low." If the threshold importance level is "Medium," then the importance level may be determined to satisfy the threshold if it is either "High" or "Medium."

Process 512B continues to step 514 if the media guidance application determines that the importance level satisfies an importance level criteria. If the media guidance application does not determine that the importance level satisfies an importance level criteria, process 512A continues at step 518.

Figure 8:
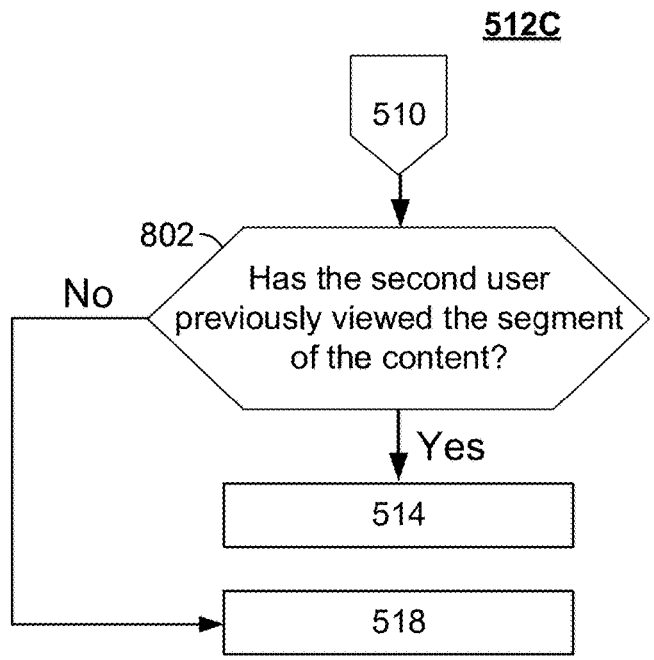
FIG. 8 is a flowchart of a detailed illustrative process for determining whether to override a command based on whether a user has previously viewed a content segment, in accordance with some embodiments of the disclosure.

FIG. 8 is a flowchart of a detailed illustrative process for determining whether to override a command based on whether a user has previously viewed a content segment, in accordance with some embodiments of the disclosure. Process 512C begins after step 510 of FIG. 5. At step 802, the media guidance application determines (e.g., using control circuitry 410) whether the second user (e.g., second user 142) has previously viewed the segment of the content (e.g., scene 124). For example, the media guidance application may use a viewing history from the user profile of the second user (e.g., retrieved from storage 414) to determine whether the user has already seen the segment. In some embodiments, the media guidance application may access granular viewing data (e.g., content consumption logs) to determine whether a current position in the content has been logged as consumed by the second user. For example, the content consumption logs may include time ranges of the content that the user has viewed, where each range includes a start and stop time of viewing (e.g., "00:00:00 to 00:10:00," "00:12:30 to 00:49:00," and "01:00:05 to 01:06:00," where the digits represent hours, minutes, and seconds). The media guidance application may determine whether the current position in the content falls within a time range that the user has viewed, as indicated in the content consumption logs. In some embodiments, the media guidance application may index information that tracks whether specific scenes have been consumed. For example, the content may be separated into scenes which are associated with adjacent time ranges in the content. The media guidance application may determine that the current position in the content is within a particular scene because it falls within the range of that scene. The media guidance application may retrieve (e.g., from storage 414) a Boolean value indicating whether the user has already viewed the scene, either in part or in full. In some embodiments, alternative to or in addition to using the viewing history of the second user, the media guidance application may determine whether the second user has previously viewed the current content segment by determining whether the segment has been played back on a particular user equipment device associated with the second user.

Process 512C continues to step 514 if the media guidance application determines that the second user has previously viewed the segment. If the media guidance application does not determine that the second user has previously viewed the segment, process 512A continues at step 518.

Figure 9:
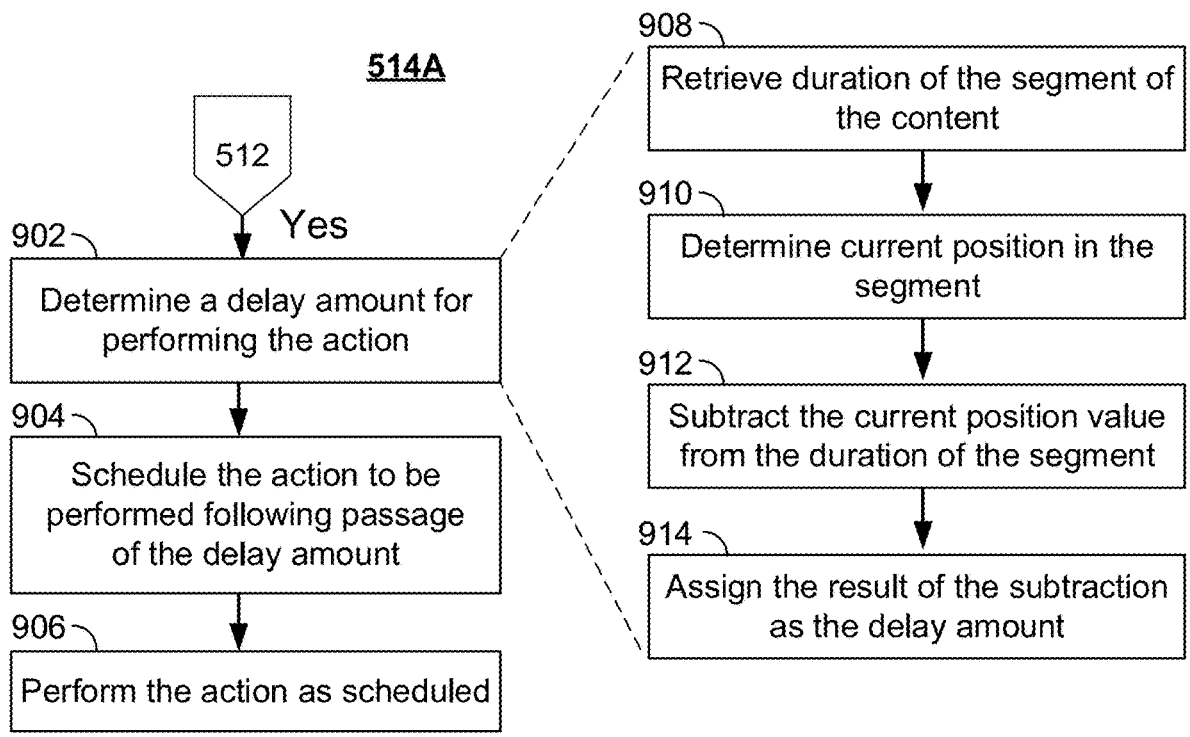
FIG. 9 is a flowchart of a detailed illustrative process for refraining from executing a command that would change content presentation, in accordance with some embodiments of the disclosure.

FIG. 9 is a flowchart of a detailed illustrative process for refraining from executing a command that would change content presentation, in accordance with some embodiments of the disclosure. Process 514A begins after step 512 of FIG. 5 if the media guidance application has determined to override the command. At step 902, the media guidance application determines (e.g., using control circuitry 410) a delay amount for performing the action associated with the first user's command to modify content presentation. In some embodiments, the media guidance application determines the delay amount in accordance with steps 908-914 of FIG. 9. At step 908, the media guidance application retrieves (e.g., using control circuitry 410, and from any of storage 308, storage 414, and/or media content source 402) the duration of the segment of content. At step 910, the media guidance application determines (e.g., using control circuitry 410) a current position in the segment. For example, the media guidance application may determine the duration of the segment of content to be 180 seconds and the current position in the segment to be 45 seconds. At step 912, the media guidance application subtracts (e.g., using control circuitry 410) the current position value from the duration of the segment. For example, the media guidance application may subtract the current position, 45 seconds, from the segment duration, 180 seconds, for a difference of 135 seconds. At step 914, the media guidance application assigns (e.g., using control circuitry 410) the result of the subtraction (e.g., 135 seconds) as the delay amount.

In some embodiments, the delay amount may be included in the generated notification message to the user indicating that a command has been overridden, as discussed above at step 516 of FIG. 5. The delay amount may be formatted to be more readable or understandable in the notification message (e.g., "2 minutes and 15 seconds" or "2:15" instead of "135 seconds"). In some embodiments, a countdown of remaining time left in the delay amount may be included in the generated notification message. For example, if the delay amount is 135 seconds, and 35 seconds have passed, the generated notification message may include a countdown starting at 100 seconds and continuously decrementing for each additional passing second. In some embodiments, the media guidance application may remove, from access by the first user, a user input associated with the command until the delay amount has elapsed. For example, the media guidance application may render a displayed option so that the option cannot be selected or change a mechanical setting in a remote control device so that a button cannot be pressed.

At step 904, the media guidance application schedules (e.g., using control circuitry 410) the action to be performed following passage of the delay amount. For example, the action associated with the command may be to change to a different program, and the media guidance application may schedule the content output to change to a different program after the delay amount has elapsed. At step 906, the media guidance application performs (e.g., using control circuitry 410) the action as scheduled. In some embodiments, after the delay amount has elapsed, the media guidance application may re-enable, for access by the first user, the user input associated with the command.

In some embodiments, the delay amount may be compounded across multiple segments of content. For example, during a first segment, the media guidance application may determine to override a command to change channels and determine the delay amount to be the remaining duration of the first segment. Once the delay amount has elapsed, the media guidance application may, prior to performing the action associated with the command, determine whether to override the command in the context of the segment following the first segment (i.e., a second segment). The media guidance application may determine, upon beginning the second segment, that the command should also be overridden for the second segment (e.g., due to an importance level of the second segment). The media guidance application may determine an additional delay amount for the command based on the second segment (e.g., the remaining duration of the second segment) and schedule the command to be performed or further evaluated after the additional delay amount has elapsed.

The above-described embodiments of the present disclosure are presented for purposes of illustration and not of limitation, and the present disclosure is limited only by the claims that follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

What is claimed is:

1. A method for overriding a command based on a user profile, the method comprising:
   identifying a first user profile of a first user and a second user profile of a second user, wherein the first user profile and the second user profile are associated with consuming a content item being presented at a user equipment, and wherein the first user is distinct from the second user;
   receiving, from a device associated with the first user profile, a command to modify presentation of a portion of the content item at the user equipment;
   determining whether the second user profile indicates interest in the portion of the content item; and
   in response to determining that the second user profile indicates interest in the portion:
      overriding the command, wherein the overriding comprises preventing modification of the presentation of the portion; and
      causing to be presented an alert related to the overriding the command.

2. The method of claim 1, wherein the determining whether the second user profile indicates interest in the portion of the content item comprises:
   determining, based on a viewing history associated with the second user profile, whether the portion has been previously consumed; and
   in response to determining the portion has not been previously consumed, determining that the second user profile indicates interest in the portion.

3. The method of claim 1, wherein the determining whether the second user profile indicates interest in the portion comprises:
   determining, based on the second user profile, a predicted interest level in the portion; and
   determining whether the predicted interest level satisfies an interest level criterion.

4. The method of claim 1, wherein the determining whether the second user profile indicates interest in the portion comprises:
   accessing metadata of the content item, wherein the metadata of the content item comprises metadata of the portion;
   determining, based on the metadata of the content item and the second user profile, an importance level of the portion.

5. The method of claim 4, wherein the importance level of the portion is further based on how important the portion is to a plotline of the content item.

6. The method of claim 1, wherein the determining whether the second user profile indicates interest in the portion comprises:
   determining, based on the second user profile, a degree of affinity for the portion of the content item.

7. The method of claim 1, wherein the preventing modification of the presentation of the portion comprises preventing the modification of the portion for a time duration based on remaining time in the presentation of the portion.

8. The method of claim 1, wherein the causing to be presented an alert related to the overriding comprises generating a message that includes a time duration for the overriding the command.

9. The method of claim 1, wherein the causing to be presented the alert related to the overriding the command comprises:
   determining one or more reason identifiers related to the overriding the command; and mapping the one or more reason identifiers to a message structure based on presentation of the alert.

10. The method of claim 1, wherein the overriding the command comprises:
scheduling execution of the command following a delay amount; and
executing the command as scheduled.

11. A system for overriding a command based on a user profile, the system comprising:
input/output (I/O) circuitry; and
control circuitry coupled to the input/output (I/O) circuitry and configured to:
identify a first user profile of a first user and a second user profile of a second user, wherein the first user profile and the second user profile are associated with consuming a content item being presented at a user equipment, and wherein the first user is distinct from the second user;
receive, using the I/O circuitry and from a device associated with the first user profile, a command to modify presentation of a portion of the content item at the user equipment;
determine whether the second user profile indicates interest in the portion of the content item; and
in response to determining that the second user profile indicates interest in the portion:
override the command, wherein the control circuitry, when overriding the command, is configured to prevent modification of the presentation of the portion; and
cause to be presented an alert related to the overriding the command.

12. The system of claim 11, wherein the control circuitry, when determining whether the second user profile indicates interest in the portion of the content item, is configured to:
determine, based on a viewing history associated with the second user profile, whether the portion has been previously consumed; and
in response to determining the portion has not been previously consumed, determine that the second user profile indicates interest in the portion.

13. The system of claim 11, wherein the control circuitry, when determining whether the second user profile indicates interest in the portion, is configured to:
determine, based on the second user profile, a predicted interest level in the portion; and
determine whether the predicted interest level satisfies an interest level criterion.

14. The system of claim 11, wherein the control circuitry, when determining whether the second user profile indicates interest in the portion, is configured to:
access metadata of the content item, wherein the metadata of the content item comprises metadata of the portion;
determine, based on the metadata of the content item and the second user profile, an importance level of the portion.

15. The system of claim 14, wherein the importance level of the portion is further based on how important the portion is to a plotline of the content item.

16. The system of claim 11, wherein the control circuitry, when determining whether the second user profile indicates interest in the portion, is configured to:
determine, based on the second user profile, a degree of affinity for the portion of the content item.

17. The system of claim 11, wherein the control circuitry, when preventing modification of the presentation of the portion, is configured to prevent the modification of the portion for a time duration based on remaining time in the presentation of the portion.

18. The system of claim 11, wherein the control circuitry, when causing to be presented the alert related to the overriding, is configured to generate a message that includes a time duration for the overriding the command.

19. The system of claim 11, wherein the control circuitry, when causing to be presented the alert related to the overriding the command, is configured to:
determine one or more reason identifiers related to the overriding the command; and
map the one or more reason identifiers to a message structure based on presentation of the alert.

20. The system of claim 11, wherein the control circuitry, when overriding the command, is configured to:
schedule execution of the command following a delay amount; and
execute the command as scheduled.

* * * * *